(12) United States Patent
Fukumoto et al.

(10) Patent No.: US 11,393,623 B2
(45) Date of Patent: Jul. 19, 2022

(54) METHOD FOR MANUFACTURING IRON CORE PRODUCT

(71) Applicant: MITSUI HIGH-TEC, INC., Fukuoka (JP)

(72) Inventors: Takashi Fukumoto, Fukuoka (JP); Kohei Yoshida, Fukuoka (JP); Junya Satake, Fukuoka (JP)

(73) Assignee: MITSUI HIGH-TEC, INC., Fukuoka (JP)

( * ) Notice: Subject to any disclaimer, the term of this patent is extended or adjusted under 35 U.S.C. 154(b) by 152 days.

(21) Appl. No.: 16/514,135

(22) Filed: Jul. 17, 2019

(65) Prior Publication Data
US 2020/0043651 A1 Feb. 6, 2020

(30) Foreign Application Priority Data

Jul. 31, 2018 (JP) .............................. JP2018-144335

(51) Int. Cl.
| | | |
|---|---|---|
| *B29C 45/14* | (2006.01) | |
| *H01F 41/02* | (2006.01) | |
| *B29K 705/12* | (2006.01) | |
| *B29L 31/00* | (2006.01) | |

(52) U.S. Cl.
CPC ... *H01F 41/0246* (2013.01); *B29C 45/14467* (2013.01); *B29C 45/14778* (2013.01); *B29C 2045/1454* (2013.01); *B29K 2705/12* (2013.01); *B29L 2031/7498* (2013.01)

(58) Field of Classification Search
CPC ............. B29C 45/14; B29C 45/14467; B29C 45/14778; B29C 2045/1454
See application file for complete search history.

(56) References Cited

U.S. PATENT DOCUMENTS

| | | |
|---|---|---|
| 2002/0047409 A1 | 4/2002 | Hiroyuki et al. |
| 2007/0063607 A1 | 3/2007 | Hattori |
| 2007/0128307 A1 | 6/2007 | Maeda et al. |
| 2007/0145849 A1 | 6/2007 | Okamoto et al. |

(Continued)

FOREIGN PATENT DOCUMENTS

| | | |
|---|---|---|
| CN | 1336711 | 2/2002 |
| CN | 1937358 | 3/2007 |

(Continued)

OTHER PUBLICATIONS

How to set the hold pressure? by Jackie Lau found at www.ecomolding.com/holding-pressure/, Apr. 9, 2018 (Year: 2018).*

(Continued)

*Primary Examiner* — Edmund H Lee
(74) *Attorney, Agent, or Firm* — Greenblum & Bernstein, P.L.C.

(57) ABSTRACT

According to one embodiment, a method for manufacturing an iron core product includes providing an iron core body which includes a magnet insertion hole in which a permanent magnet is disposed, injecting a molten resin into the magnet insertion hole of the iron core body at a first pressure, and setting a pressure applied to the molten resin to a second pressure lower than the first pressure after the molten resin is injected into the magnet insertion hole and before the molten resin is cured.

6 Claims, 8 Drawing Sheets

(56) References Cited

U.S. PATENT DOCUMENTS

| | | | |
|---|---|---|---|
| 2011/0000079 A1* | 1/2011 | Fukumaru | H02K 1/2766 29/598 |
| 2012/0274165 A1 | 11/2012 | Fukaya et al. | |
| 2013/0162063 A1* | 6/2013 | Sasajima | H02K 1/27 310/43 |
| 2013/0214620 A1 | 8/2013 | Kobayash et al. | |
| 2013/0298384 A1 | 11/2013 | Kato et al. | |
| 2013/0309341 A1 | 11/2013 | Kato | |
| 2014/0103574 A1 | 4/2014 | Ishimatsu | |
| 2014/0131919 A1 | 5/2014 | Mabu | |
| 2014/0327329 A1* | 11/2014 | Kitada | H02K 15/03 310/43 |
| 2016/0263794 A1 | 9/2016 | Yomoda et al. | |
| 2017/0028596 A1* | 2/2017 | Moller | B29C 39/265 |
| 2017/0117781 A1 | 4/2017 | Yoshida et al. | |
| 2018/0065285 A1 | 3/2018 | Okudaira et al. | |
| 2018/0102698 A1 | 4/2018 | Iwamoto et al. | |
| 2018/0108384 A1 | 4/2018 | Iwamoto et al. | |
| 2018/0183305 A1 | 6/2018 | Kino | |
| 2019/0097503 A1 | 3/2019 | Ushida et al. | |

FOREIGN PATENT DOCUMENTS

| | | |
|---|---|---|
| CN | 1988325 | 6/2007 |
| CN | 102804562 | 11/2012 |
| CN | 103259355 | 8/2013 |
| CN | 103730993 | 4/2014 |
| CN | 103812282 | 5/2014 |
| CN | 104854781 | 8/2015 |
| CN | 106849546 | 6/2017 |
| CN | 107249844 | 10/2017 |
| CN | 108242873 | 7/2018 |
| DE | 112012000293 | 9/2013 |
| EP | 1 801 955 | 6/2007 |
| EP | 1983636 | 10/2008 |
| JP | 53-99401 | 8/1978 |
| JP | 61-005909 | 1/1986 |
| JP | 2002-247784 | 8/2002 |
| JP | 2007-159245 | 6/2007 |
| JP | 2007-318942 | 12/2007 |
| JP | 2012-235697 A | 11/2012 |
| JP | 2013-59185 A | 3/2013 |
| JP | 2013-102654 A | 5/2013 |
| JP | 5352896 | 11/2013 |
| JP | 2015-192574 | 11/2015 |
| JP | 2018-68059 | 4/2018 |
| WO | 2017/159348 | 9/2017 |
| WO | 2020/095349 A1 | 5/2020 |

OTHER PUBLICATIONS

Official Communication issued in European Patent Office (EPO) Patent Application No. 19186885.0, dated Nov. 28, 2019.

European Official Action issued in EP Application No. 19186885.0, dated Jul. 14, 2020.

\* cited by examiner

METHOD FOR MANUFACTURING IRON CORE PRODUCT

CROSS REFERENCE TO RELATED APPLICATION(S)

This application is based upon and claims the benefit of priority of Japanese Patent Application No. 2018-144335 filed on Jul. 31, 2018, the contents of which are incorporated herein by reference in its entirety.

BACKGROUND OF THE INVENTION

1. Field of the Invention

The present disclosure relates to a method and an apparatus for manufacturing an iron core product.

2. Description of the Related Art

JP-A-2013-059185 referred to as Patent Literature 1 discloses a resin filling apparatus including a pair of dies (upper and lower dies) and a plurality of plungers. The lower die is configured to place an iron core body provided with a plurality of magnet insertion holes. The upper die is configured to pinch the iron core body together with the lower die in an up-down direction. The upper die is provided with a plurality of resin pots that extend in the up-down direction. Each of the plungers is configured to be retractable in the corresponding pot.

A rotor iron core is manufactured by filling each magnetic insertion hole of the iron core body with a resin (molten resin) in a molten state using the resin filling apparatus described in JP-A-2013-059185. Specifically, a rotor iron core manufacturing method includes: pinching the iron core body with a magnet inserted into each magnet insertion hole, with the upper and lower dies; extruding the molten resin from each pot by each plunger; and injecting the molten resin into each magnet insertion hole. Accordingly, the permanent magnets respectively inserted in the magnet insertion holes are sealed with a resin, and the rotor iron core is obtained.

Patent Literature 1: JP-A-2013-059185

SUMMARY OF THE INVENTION

The molten resin in the pot is injected into the magnet insertion hole by the plunger at a predetermined pressure such that a region unfilled with the resin is not generated in the magnet insertion hole. Depending on a set value of the pressure at this time, there is a case where the magnet insertion hole is pressurized via the molten resin, and the iron core body swells. In this case, a deviation may occur in the outer shape of the obtained rotor iron core from the design dimensions, and thus, the performance of the rotor iron core is affected.

Here, the present disclosure describes a method and an apparatus for manufacturing an iron core product that can suppress the swelling of the iron core product caused by the injection of the molten resin.

According to one aspect of the disclosure, there is provided a method for manufacturing an iron core product including: providing an iron core body which includes a magnet insertion hole in which a permanent magnet is disposed; injecting a molten resin into the magnet insertion hole at a first pressure; and setting a pressure applied to the molten resin to a second pressure lower than the first pressure after the molten resin is injected into the magnet insertion hole and before the molten resin is cured.

According to another aspect of the disclosure, there is provided an apparatus for manufacturing an iron core product including: a resin injection device configured to inject a molten resin into an iron core body; and a controller. The controller is configured to control the resin injection device to inject a molten resin into a magnet insertion hole, in which a permanent magnet is disposed, of the iron core body at a first pressure, and control the resin injection device to set a pressure applied to the molten resin to a second pressure lower than the first pressure after the molten resin is injected into the magnet insertion hole and before the molten resin is cured.

According to a method and an apparatus for manufacturing an iron core product according to the disclosure, the swelling of the iron core product caused by the injection of the molten resin can be suppressed.

DETAILED DESCRIPTION OF THE EXEMPLARY EMBODIMENTS

Hereinafter, an example of an embodiment according to the disclosure will be described in more detail with reference to the accompanying drawings. In the following description, the same elements or elements having the same function will be given the same reference numerals and signs, and the duplicated description will be omitted.

Configuration of Rotor Laminated Iron Core

First, a configuration of a rotor laminated iron core 1 will be described with reference to FIGS. 1 and 2. The rotor laminated iron core 1 is a part of a rotor. The rotor is configured by attaching an end surface plate and a shaft (which are not illustrated) to the rotor laminated iron core 1. An electric motor (motor) is configured by combining the rotor with a stator. The rotor laminated iron core 1 in the embodiment is used for an interior permanent magnet type (IPM) motor.

Figure 1:
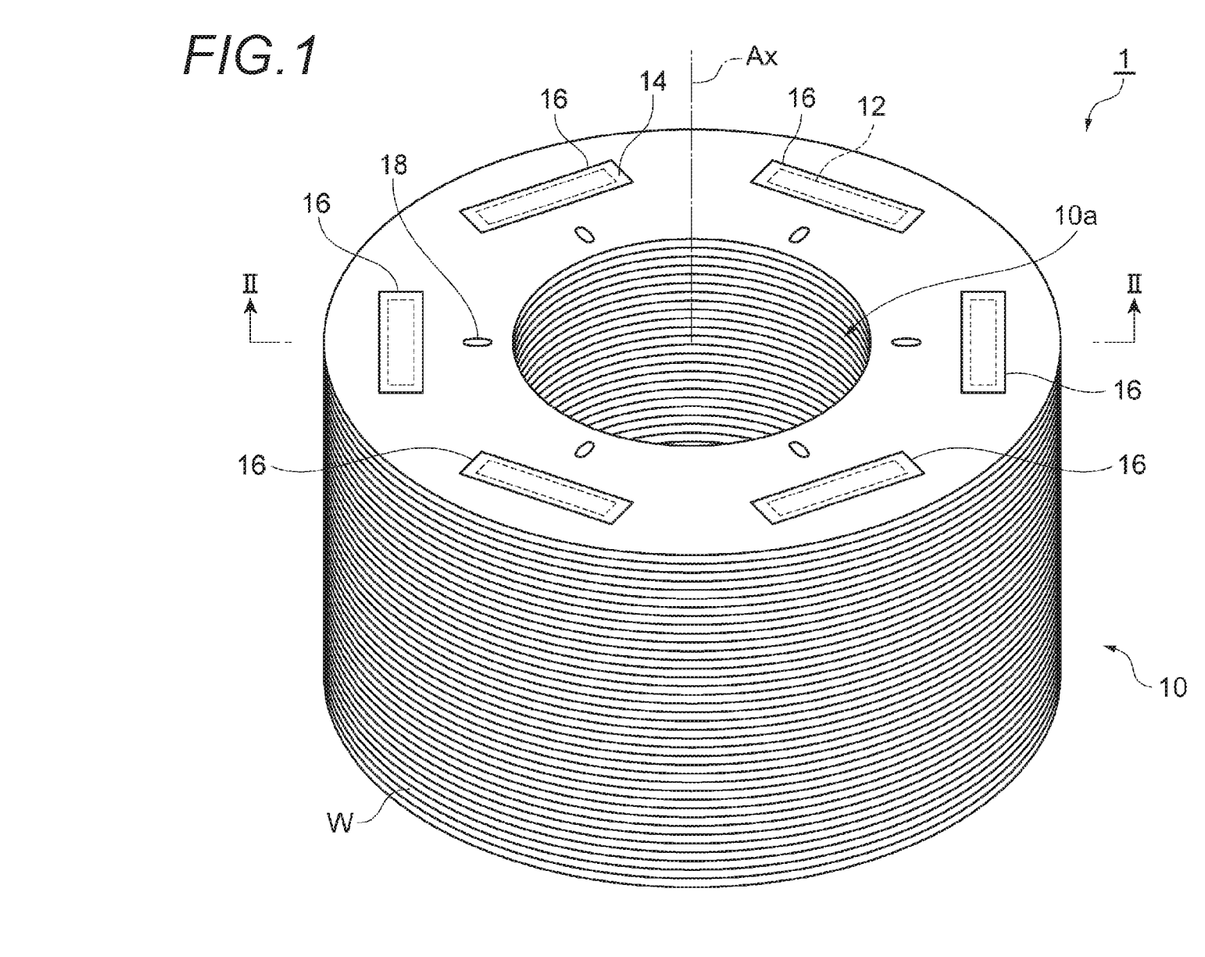
FIG. 1 is a perspective view illustrating an example of a rotor laminated iron core.

As illustrated in FIG. 1, the rotor laminated iron core 1 includes a laminated body 10 (iron core body), a plurality of permanent magnets 12, and a plurality of solidified resins 14.

The laminated body 10 has a cylindrical shape, as illustrated in FIG. 1. At a center portion of the laminated body 10, a shaft hole 10a which penetrates the laminated body 10 to extend along a center axis Ax is provided. In other words, the shaft hole 10a extends in a height direction (lamination direction) of the laminated body 10. In the embodiment, since the laminated body 10 rotates around the center axis Ax, the center axis Ax is also a rotation axis. A shaft is inserted into the shaft hole 10a.

A plurality of magnet insertion holes 16 are formed in the laminated body 10. As illustrated in FIG. 1, the magnet insertion holes 16 are arranged at predetermined intervals along an outer circumferential edge of the laminated body 10. As illustrated in FIG. 2, the magnet insertion hole 16 penetrates the laminated body 10 to extend along the center axis Ax.

In other words, the magnet insertion hole 16 extends in the height direction.

In the embodiment, the shape of the magnet insertion hole 16 is a long hole extending along the outer circumferential edge of the laminated body 10. The number of magnet insertion holes 16 is six in the embodiment. The plurality of magnet insertion holes 16 are arranged at predetermined intervals along the outer circumferential edge of the laminated body 10 when viewed from above. The position, the shape, and the number of magnet insertion holes 16 may change depending on the application of the motor, the required performance, and the like.

The laminated body 10 is configured by stacking a plurality of punched members W. The punched member W is a plate-like body in which an electromagnetic steel sheet ES which will be described later is punched into a predetermined shape, and has a shape that corresponds to the laminated body 10. The laminated body 10 may be configured by so-called rotary lamination. The term "rotary lamination" refers to stacking the plurality of punched members W while relatively changing an angle between the punched members W.

The rotary lamination is performed mainly for the purpose of absorbing the thickness deviation of the laminated body 10. The angle of the rotary lamination may be set to any magnitude.

Figure 2:
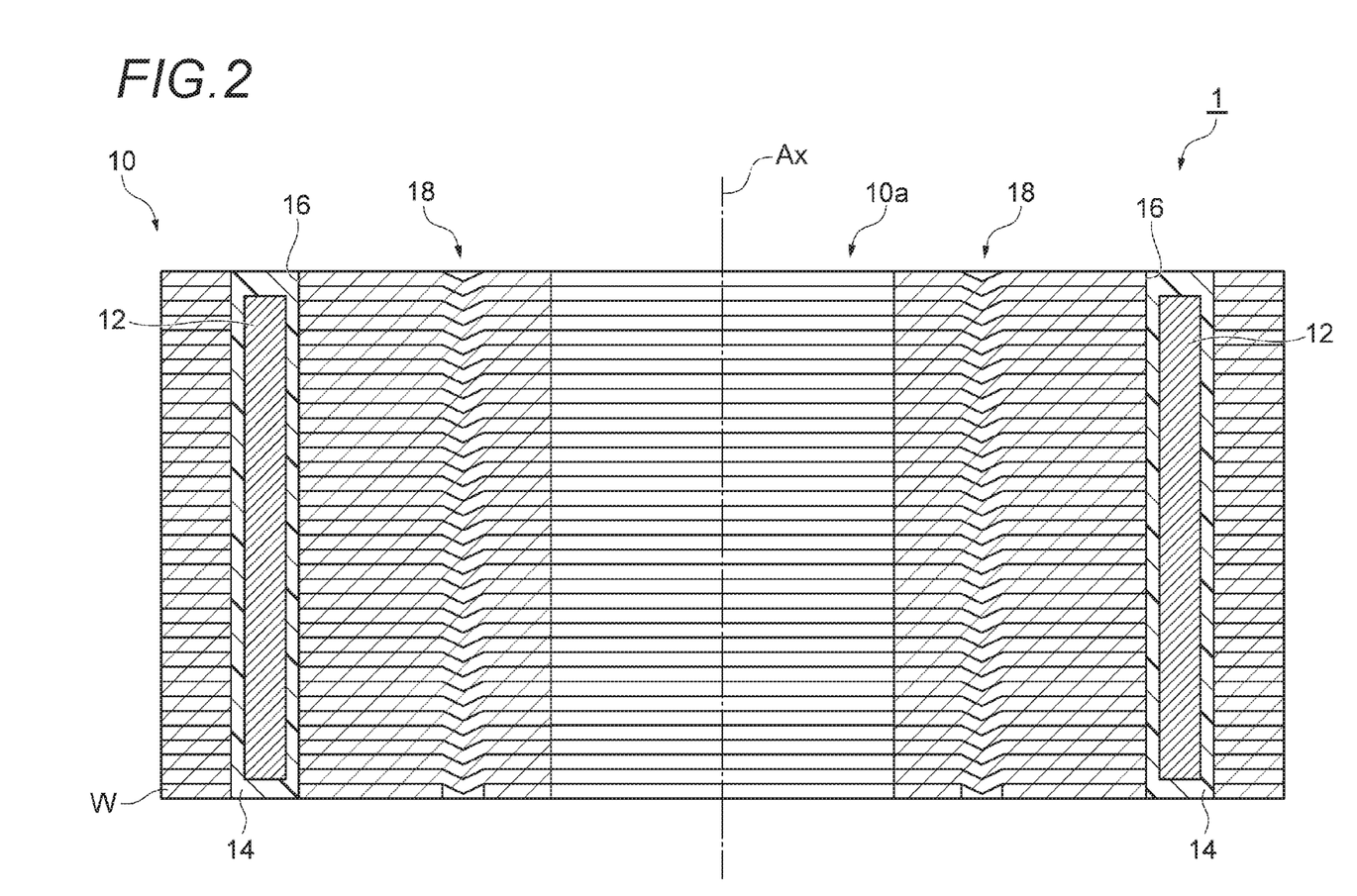
FIG. 2 is a sectional view taken along line II-II of FIG. 1.

The punched members W adjacent to each other in the height direction may be fastened by a caulking unit 18 as illustrated in FIGS. 1 and 2. The punched members W may be fastened by various known methods instead of the caulking unit 18. For example, the plurality of punched members W may be joined to each other using an adhesive or a resin material, or may be joined to each other by welding. Alternatively, a temporary caulking member may be provided in the punched member W, and the temporary caulking member may be removed from a laminated body after a plurality of punched members W are fastened via the temporary caulking member to obtain the laminated body 10. In addition, the "temporary caulking member" means a caulking member which is used to temporarily integrate a plurality of punched members W and is removed in the process of manufacturing the product (rotor laminated iron core 1).

As illustrated in FIGS. 1 and 2, permanent magnets 12 are inserted into each of the magnet insertion holes 16 one by one. The shape of the permanent magnet 12 is not particularly limited, but has a rectangular parallelepiped shape in the embodiment. The type of permanent magnet 12 may be determined in accordance with the application of the motor, the required performance, and the like, and may be, for example, a sintered magnet or a bonded magnet.

The solidified resin 14 is obtained by solidifying a molten resin after the magnet insertion hole 16 with the permanent magnet 12 inserted therein is filled with a resin material (molten resin) in a molten state. The solidified resin 14 has a function of fixing the permanent magnet 12 in the magnet insertion hole 16 and a function of joining the adjacent punched members W to each other in the height direction. Examples of the resin material that configures the solidified resin 14 include a thermosetting resin, a thermoplastic resin, and the like. Specific examples of the thermosetting resin, for example, include a resin composition containing an epoxy resin, a curing initiator, and an additive. Examples of the additive include a filler, a flame retardant, a stress reducing agent, and the like.

Manufacturing Apparatus of Rotor Laminated Core

Figure 3:
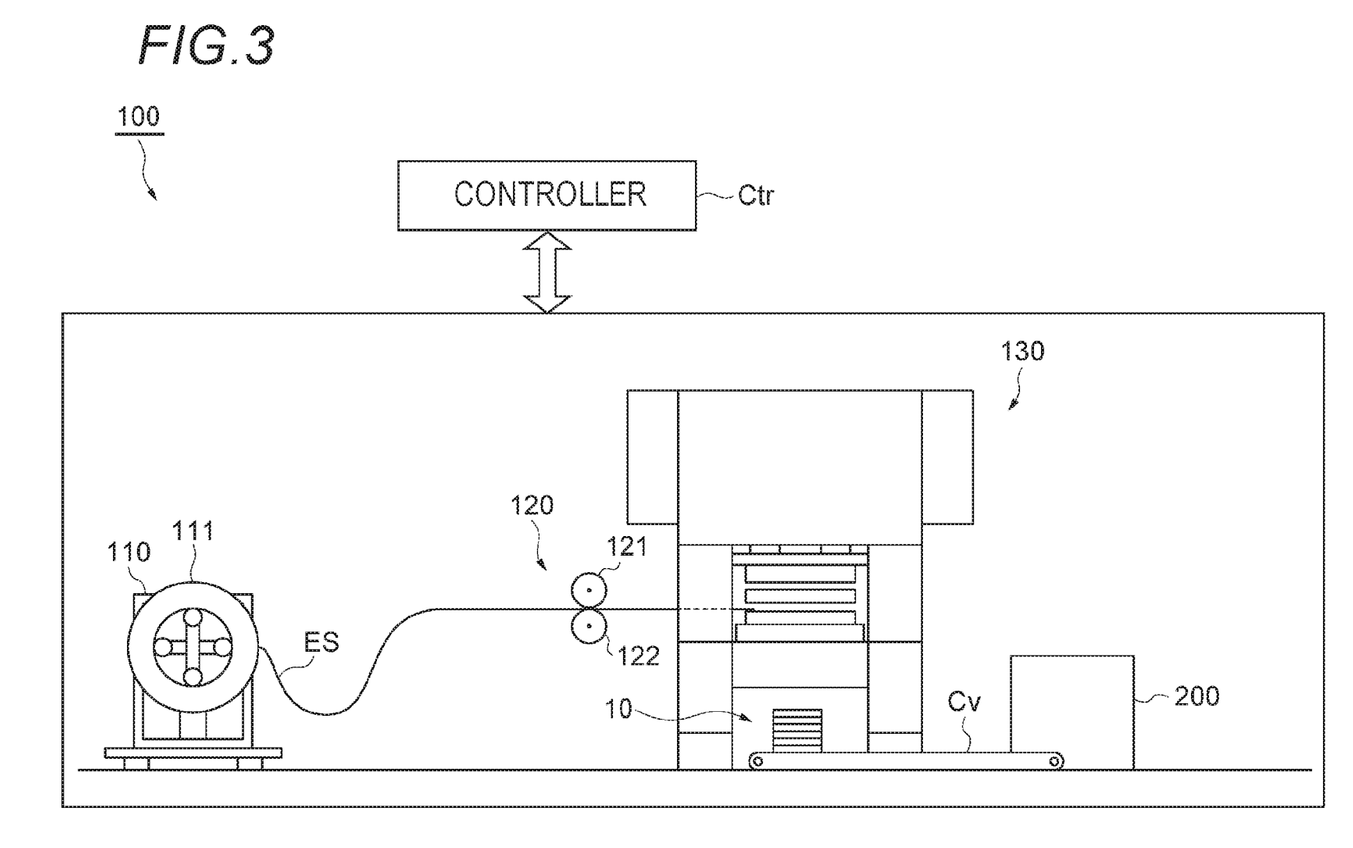
FIG. 3 is a schematic view illustrating an example of a manufacturing apparatus of the rotor laminated iron core.

Next, with reference to FIGS. 3 and 4, a manufacturing apparatus 100 of the rotor laminated iron core 1 will be described.

The manufacturing apparatus 100 is an apparatus for manufacturing the rotor laminated iron core 1 from the electromagnetic steel sheet ES (workpiece plate) which is a belt-like metal plate. The manufacturing apparatus 100 includes an uncoiler 110, a feeding device 120, a punching device 130, a magnet mounting device 200 (a resin injection device), and a controller Ctr (control unit).

The uncoiler 110 rotatably holds a coil material 111 in a state where the coil material 111 which is the strip-like electromagnetic steel sheet ES wound in a coil shape is installed. The feeding device 120 includes a pair of rollers 121 and 122 which sandwich the electromagnetic steel sheet ES from above and below. The pair of rollers 121 and 122 rotate and stop based on an instruction signal from the controller Ctr. and intermittently feeds the electromagnetic steel sheets ES toward the punching device 130 in order.

The punching device 130 operates based on the instruction signal from the controller Ctr. The punching device 130 has a function of sequentially punching the electromagnetic steel sheets ES intermittently fed by the feeding device 120 to form the punched member W. and a function of sequentially laminating the punched members W obtained by the punching processing to manufacture the laminated body 10.

When the laminated body 10 is discharged from the punching device 130, the laminated body 10 is placed on a conveyor Cv provided to extend between the punching device 130 and the magnet mounting device 200. The conveyor Cv operates based on an instruction from the controller Ctr, and feeds the laminated body 10 to the magnet mounting device 200. In addition, the laminated body 10 may be conveyed by a device other than the conveyor Cv between the punching device 130 and the magnet mounting device 200. For example, the laminated body 10 may be manually conveyed in a state of being placed in a container.

The magnet mounting device 200 operates based on the instruction signal from the controller Ctr. The magnet mounting device 200 has a function of inserting the permanent magnet 12 into each magnet insertion hole 16 and a function of filling the magnet insertion hole 16 into which the permanent magnet 12 is inserted with the molten resin. As illustrated in detail in FIG. 4, the magnet mounting device 200 includes a lower die 210, an upper die 220, and a plurality of plungers 230.

The lower die 210 includes a base member 211 and an insertion post 212 provided on the base member 211. The base member 211 is a plate-like member, and has, for example, a rectangular shape or a circular shape. The base member 211 is configured to be capable of placing the laminated body 10. The insertion post 212 is positioned approximately at the center portion of the base member 211, and protrudes upward from an upper surface of the base member 211. The insertion post 212 has a cylindrical shape, and has an outer shape corresponding to the shaft hole 10a of the laminated body 10.

The upper die 220 is configured to be capable of pinching the laminated body 10 in the height direction together with the lower die 210. When the upper die 220 pinches the laminated body 10 together with the lower die 210, a predetermined load is applied to the laminated body 10 from the height direction.

The upper die 220 includes a base member 221 and a built-in heat source 222. The base member 221 is a plate-like member having a rectangular shape. The base member 221 is provided with one through-hole 221a and a plurality of accommodation holes 221b. The through-hole 221a is positioned approximately at the center portion of the base member 221. The through-hole 221a has a shape (substantially circular shape) corresponding to the insertion post 212, and the insertion post 212 can be inserted therein.

The plurality of accommodation holes 221b penetrate the base member 221 and are arranged at predetermined intervals along the periphery of the through-hole 221a. Each of the accommodation holes 221b is positioned at positions respectively corresponding to the magnet insertion holes 16 of the laminated body 10 when the lower die 210 and the upper die 220 pinch the laminated body 10. Each of the accommodation holes 221b has a cylindrical shape, and can accommodate at least one resin pellet P.

The built-in heat source 222 is, for example, a heater built in the base member 221. When the built-in heat source 222 operates, the base member 221 is heated, the laminated body 10 which is in contact with the base member 221 is heated, and the resin pellets P accommodated in each of the accommodation holes 221b are heated. Accordingly, the resin pellets P are melted and changed to a molten resin.

The plurality of plungers 230 are positioned above the upper die 220. Each of the plungers 230 is connected to the driving sources 231, respectively. Each driving source 231 is configured to operate the corresponding plunger 230 based on the instruction from the controller Ctr. Therefore, each plunger 230 is configured to be capable of being independently inserted into and removed from the corresponding accommodation hole 221b by each of the driving sources 231.

The controller Ctr generates the instruction signal for operating each of the feeding device 120, the punching device 130, and the magnet mounting device 200 and transmitting the instruction signal to these devices, based on, for example, a program recorded in a recording medium (not illustrated) or an operation input from an operator.

Manufacturing Method of Rotor Laminated Iron Core

Subsequently, with reference to FIGS. 4 and 5, a manufacturing method of the rotor laminated iron core 1 will be described. Here, the description of the process of forming the laminated body 10 by the punching device 130 will be omitted, and the subsequent processes will be described.

Figure 4:
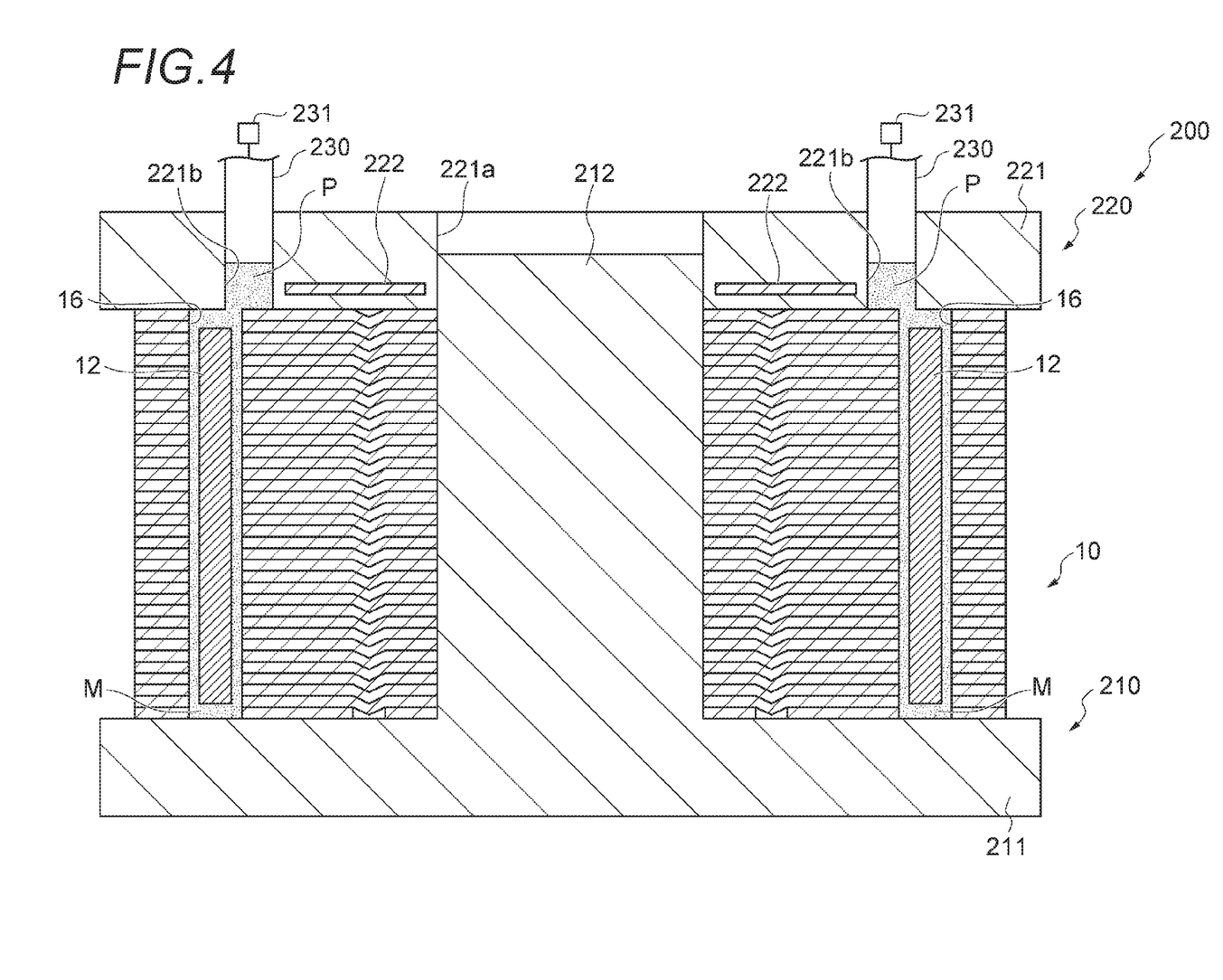
FIG. 4 is a sectional view for describing an example of mounting a permanent magnet to a magnet insertion hole of the rotor laminated iron core by a magnet mounting device.

First, the laminated body 10 is conveyed to the magnet mounting device 200, and as illustrated in FIG. 4, the laminated body 10 is placed on the lower die 210 of the magnet mounting device 200 to become a state where the insertion post 212 is inserted into the shaft hole 10a. Next, the permanent magnets 12 are inserted into each of the magnet insertion holes 16. The insertion of the permanent magnets 12 into each magnet insertion hole 16 may be performed manually, or may be performed by a robot hand (not illustrated) or the like included in the magnet mounting device 200, based on the instruction from controller Ctr.

Next, the upper die 220 is placed on the laminated body 10. Thereafter, the laminated body 10 is pinched in the height direction by the lower die 210 and the upper die 220, and the laminated body 10 is pressurized. Next, the resin pellets P are charged into each accommodation hole 221b. When the resin pellets P are melted by the built-in heat source 222 of the upper die 220, the controller Ctr controls each driving source 231, and the molten resin M is injected into each magnet insertion hole 16 by the plunger 230 such that the injection pressure applied to the molten resin M from the plunger 230 becomes a pressure P1 (first pressure). At this time, the laminated body 10 is heated to, for example, approximately 150° C. to 180° C. by the built-in heat source 222.

Next, after the magnet insertion hole 16 is filled with the molten resin M and before the molten resin M is cured, the controller Ctr controls each driving source 231 to change the injection pressure of the plunger 230 to a pressure P2 (second pressure). The pressure P2 is set to be lower than the pressure P1. Since the position of the plunger 230 is proportional to the injection pressure of the plunger 230, the plunger 230 is pushed back outward by the molten resin M by decreasing the pressure P1 to the pressure P2 (refer to arrow Ar1 in FIG. 5).

The pressure P2 may be, for example, ¾ or lower of the pressure P1 or ½ or lower of the pressure P1. The timing at which the pressure P1 is changed to the pressure P2 is not particularly limited as long as the timing is after the magnet insertion hole 16 is filled with the molten resin M and before the molten resin M is cured or solidified, but the timing may be after the magnet insertion hole 16 is filled with the molten resin M and before the gel time of the molten resin M elapses. Namely, the timing is after finishing injecting the molten resin M into the magnet insertion hole 16 and before finishing curing the molten resin in the magnet insertion hole 16.

Figure 5:
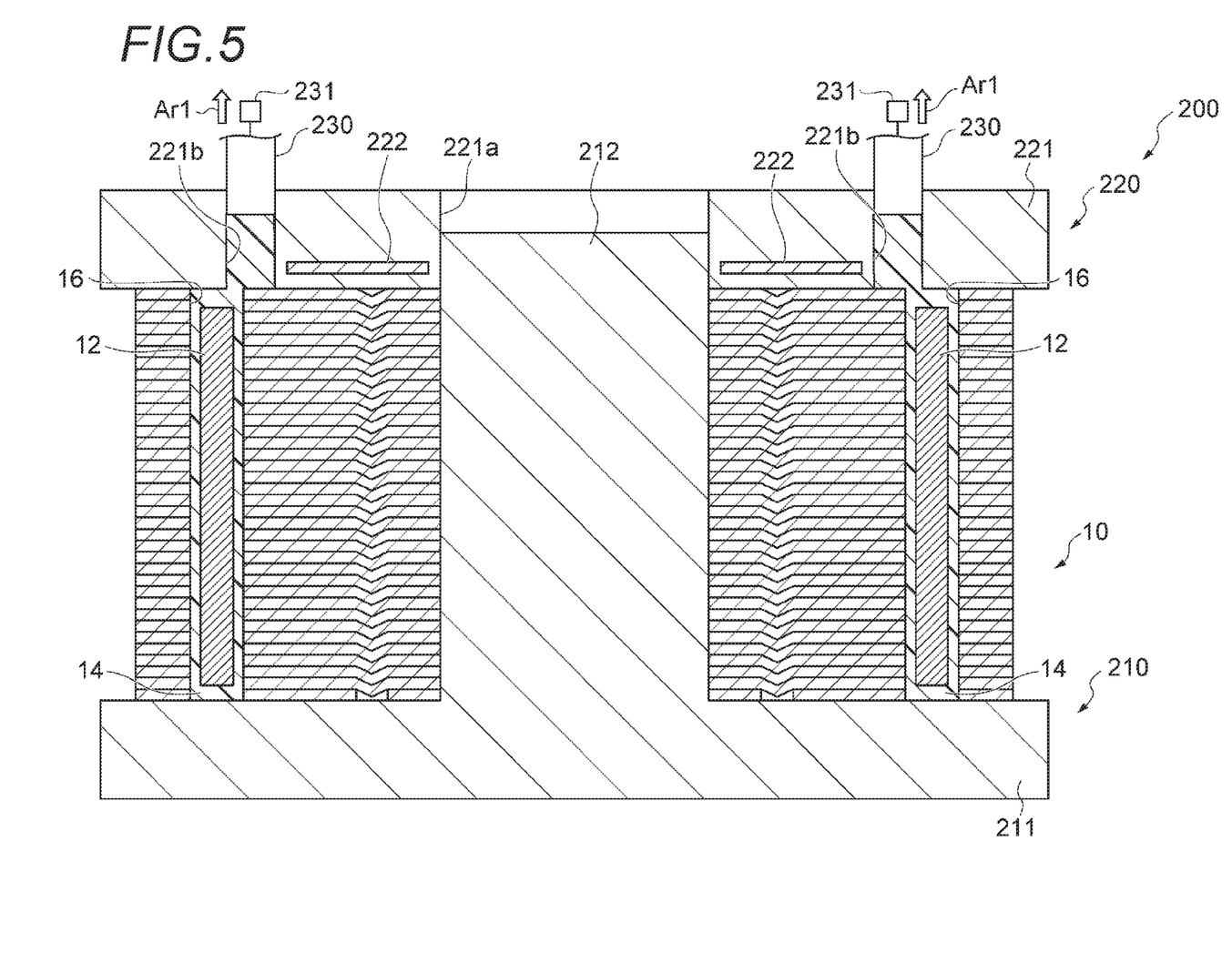
FIG. 5 is a sectional view for describing a process after FIG. 4.

Thereafter, when the molten resin M is solidified, as illustrated in FIG. 5, the solidified resin 14 is formed in the magnet insertion hole 16. In this manner, the permanent magnet 12 is mounted to the laminated body 10 together with solidified resin 14. When the laminated body 10 is extracted from magnet mounting device 200, the rotor laminated iron core 1 is completed.

Operational Effect

In the above-described embodiment, after the injection of the molten resin M into the magnet insertion hole 16 and before the curing of the molten resin M, the pressure that acts on the molten resin M changes from the pressure P1 to the pressure P2. In other words, the pressure that acts on the molten resin M decreases in a state where the molten resin does not lose the fluidity before the solidification. Therefore, since a part of the molten resin M returns to the outside (in the accommodation hole 221b) of the magnet insertion hole 16 according to the change in pressure, the pressure that acts on the magnet insertion hole 16 from the molten resin M also decreases. Therefore, the swelling of the rotor laminated iron core 1 caused by the injection of the molten resin M can be suppressed. As a result, the rotor laminated iron core 1 having an outer shape according to the design dimensions can be obtained.

In the above-described embodiment, the pressure P1 is changed to the pressure P2 after the magnet insertion hole 16 is filled with the molten resin M and before the gel time of the molten resin M elapses. In other words, before the viscosity of the molten resin M substantially increases, the pressure that acts on the molten resin M changes from the pressure P1 to the pressure P2. In this case, since a part of the molten resin M returns to the outside (in the accommodation hole 221b) of the magnet insertion hole 16 in a state where the fluidity is higher, the pressure that acts on the magnet insertion hole 16 from the molten resin M decreases further. Therefore, the swelling of the core product caused by the injection of the molten resin can be further suppressed.

Modification

As described above, although the embodiment according to the disclosure has been described in detail, various modifications may be added to the above-described embodiment in a range without departing from the scope of claims and the gist thereof.

Figure 6:
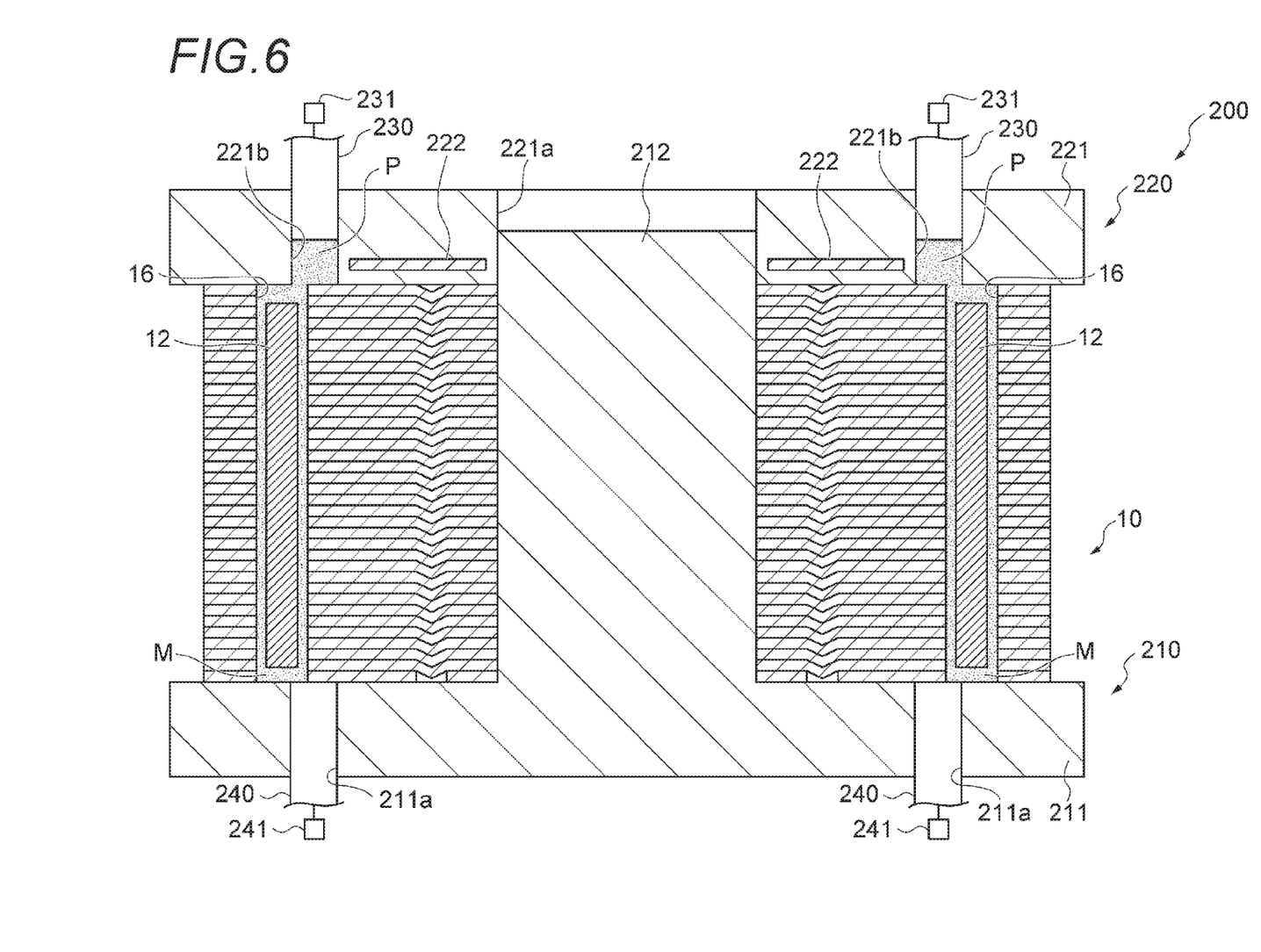
FIG. 6 is a sectional view for describing another example of mounting the permanent magnet to the magnet insertion hole of the rotor laminated iron core by the magnet mounting device.

(1) In the above-described embodiment, the molten resin M is returned to the accommodation hole 221b by changing the injection pressure of the plunger 230, but a part of the molten resin M may be made to flow into a space different from the accommodation hole 221b to which the molten resin M is injected. Specifically, as illustrated in FIG. 6, in the magnet mounting device 200, the lower die 210 is provided with a plurality of through-holes 211a, and the plungers 240 may be disposed to be insertable into and removable from the through-holes 211a one by one. Each driving source 241 respectively connected to the plurality of plungers 240 is configured to operate the corresponding plunger 240 based on the instruction from the controller Ctr.

Subsequently, the operation of the magnet mounting device 200 illustrated in FIG. 6 will be described. First, the controller Ctr instructs each driving source 241 to position the plunger 240 such that a distal end of the plunger 240 is positioned at a top dead point that substantially matches the upper surface of the base member 211. In this state, the controller Ctr instructs each driving source 231 and injects the molten resin M into each of the magnet insertion holes 16 by the plunger 230 such that the injection pressure applied to the molten resin M from the plunger 230 becomes the pressure P1.

Figure 7:
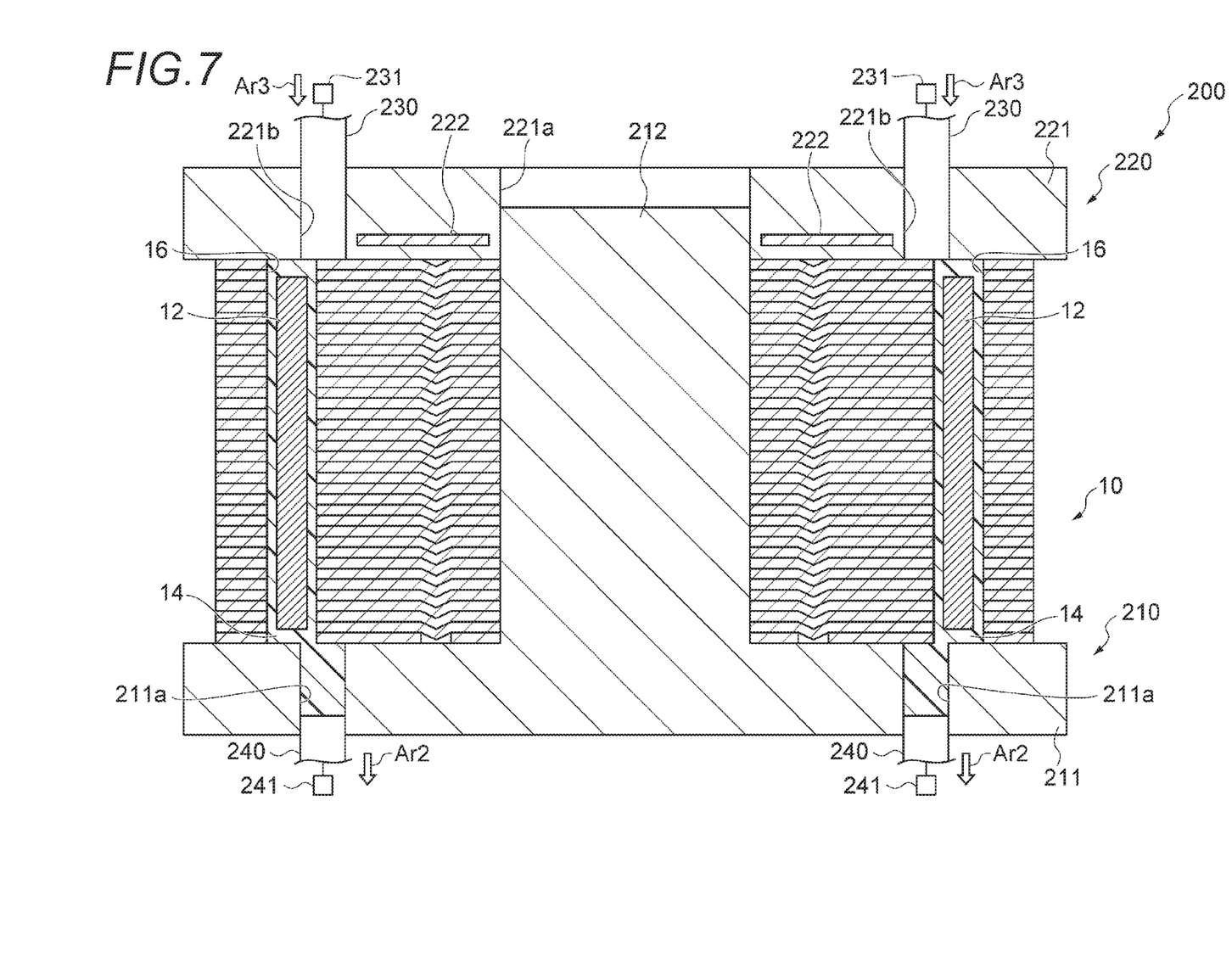
FIG. 7 is a sectional view for describing a process after FIG. 6.

Next, in a state where the pressure is applied to the molten resin M from the plunger 230, after the magnet insertion hole 16 is filled with the molten resin M and before the molten resin M is cured, the controller Ctr controls each driving source 241 and lowers the plunger 240 (refer to arrow Ar2 in FIG. 7). In this manner, a space formed by the upper surface of the plunger 240 and the through-hole 211a is formed in the base member 211, and a part of the molten resin M flows into the space. The lowered amount of the plunger 240 is set such that the pressure P2 that acts on the molten resin M after the lowering of the plunger 240 is lower than the pressure P. In addition, the plunger 230 may also be lowered along with the lowering of the plunger 240 (refer to arrow Ar3 in FIG. 7). In this case, the lowered amount of the plunger 240 is set such that the pressure P2 acting on the molten resin M after the lowering of the plungers 230 and 240 is lower than the pressure P1.

Figure 8A:
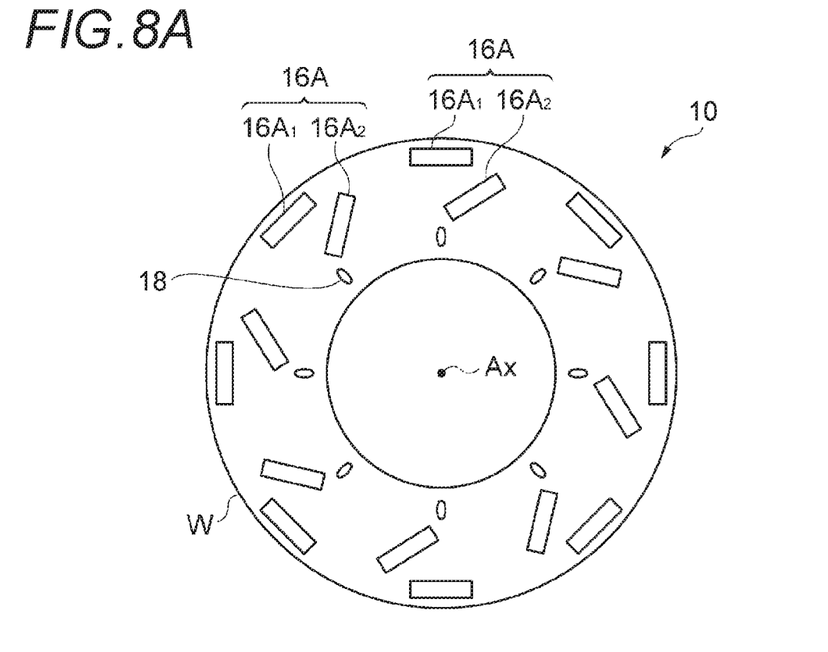
FIGS. 8A and 8B are top views illustrating another example of the rotor laminated iron core.
Figure 8B:
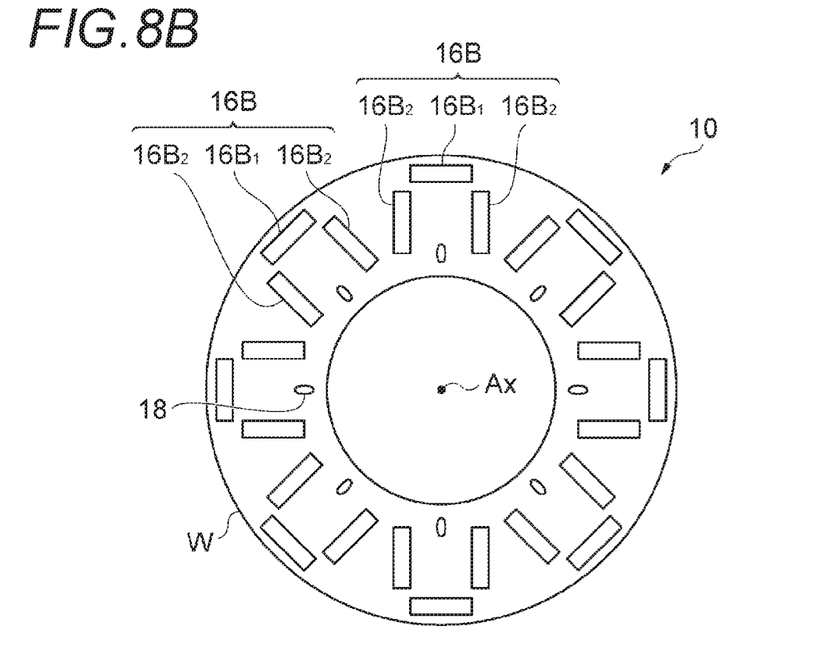

(2) As illustrated in FIGS. 8A and 8B, a set configured with the plurality of magnet insertion holes may be arranged at predetermined intervals along the outer circumferential edge of the laminated body 10. In the example illustrated in FIG. 8A, one magnet insertion hole $16A_1$ and one magnet insertion hole $16A_2$ form a set of hole units 16A, and eight sets of hole units 16A are arranged at predetermined intervals along the outer circumferential edge of laminated body 10. The magnet insertion hole $16A_1$ extends along the circumferential direction of the laminated body 10. The magnet insertion hole $16A_2$ extends from the vicinity of the outer circumferential edge of the laminated body 10 to the vicinity of the inner circumferential edge. Specifically, when viewed from the height direction of the laminated body 10, the magnet insertion hole $16A_2$ extends to intersect the longitudinal direction of the magnet insertion hole $16A_1$. In addition, the radial direction of the laminated body 10 is also included in the direction intersecting the longitudinal direction of the magnet insertion hole $16A_1$.

The pressure P1 of when injecting the molten resin into the magnet insertion hole $16A_1$ may be different from the pressure P3 (third pressure) of when injecting the molten resin into the magnet insertion hole $16A_2$. After injecting the molten resin M into the magnet insertion holes $16A_1$ and $16A_2$ and before curing the molten resin M, the pressure acting on the molten resin M of the magnet insertion hole $16A_1$ changes from the pressure P1 to the pressure P2, and the pressure acting on the molten resin M (the other molten resin) of the magnet insertion hole $16A_2$ (the other magnet insertion hole) may change from the pressure P3 to the pressure P4 (fourth pressure). The pressure P4 is set to be lower than the pressure P3. The pressure P4 may be, for example, ¾ or lower of the pressure P3 or ½ or lower of the pressure P3. In this case, the pressure at the time of the injection of the molten resin M is set independently for each of the magnet insertion holes $16A_1$ and $16A_2$. Therefore, the molten resin can be injected into the magnet insertion hole at an appropriate pressure in accordance with the size, shape, position, and the like of the magnet insertion hole.

Incidentally, when the magnet insertion hole $16A_1$ extends along the circumferential direction of the laminated body 10, the projected area of the magnet insertion hole $16A_1$ with respect to the circumferential surface of the laminated body 10 tends to increase. Therefore, when the molten resin M is injected into the magnet insertion hole $16A_1$, the force of the molten resin M that acts toward the circumferential surface of the laminated body 10 becomes larger, and the rotor laminated iron core 1 tends to easily swell. Here, the above-described pressure P1 may be set to be lower than the pressure P3. In other words, the pressure P1 of when injecting the molten resin M into the magnet insertion hole $16A_1$ that extends along the circumferential direction of the laminated body 10 may be lower than the pressure P3 of when injecting the molten resin M into the magnet insertion hole $16A_2$ that extends along the radial direction of the laminated body 10. In this case, the force that acts from the magnet insertion hole $16A_1$ toward the circumferential surface of the laminated body 10 becomes relatively small. Therefore, the swelling of the rotor laminated iron core 1 caused by the injection of the molten resin M can be further suppressed.

In the example illustrated in FIG. 8B, one magnet insertion hole $16B_1$ and two magnet insertion holes $16B_2$ form one set of hole units $16B_1$ and eight sets of hole units 16B are arranged at predetermined intervals along the outer circumferential edge of laminated body 10. The magnet insertion hole $16B_1$ extends along the circumferential direction of the laminated body 10. The magnet insertion hole 16B$_2$ extends from the vicinity of the outer circumferential edge of the laminated body 10 to the vicinity of the inner circumferential edge. Specifically, when viewed from the height direction of the laminated body 10, the magnet insertion hole 16B$_2$ extends to intersect the longitudinal direction of the magnet insertion hole 16B$_1$. In addition, the radial direction of the laminated body 10 is also included in the direction intersecting the longitudinal direction of the magnet insertion hole 16B$_1$. The relationship of the pressure at the time of injecting the molten resin into the magnet insertion holes 16B$_1$ and 16B$_2$ may be the same as the above-described relationship of the pressure at the time of injecting the molten resin into the magnet insertion holes 16A$_1$ and 16A$_2$.

(3) Similar to the example illustrated in FIGS. 8A and 8B, when one set of hole units is configured with a plurality of magnet insertion holes, the pressure of when injecting the molten resin M into each magnet insertion hole may change in accordance with the distance between the plurality of magnet insertion holes that configure one set of hole units and the outer circumferential surface of the laminated body 10. For example, as the position of the magnet insertion hole is closer to the outer circumferential surface of the laminated body 10, the pressure of when injecting the molten resin M into the magnet insertion hole may be set to be low.

(4) In the above-described embodiment, after the laminated body 10 is placed on the lower die 210, the permanent magnet 12 is inserted into each magnet insertion hole 16, but the laminated body 10 may be placed on the lower die 210 in a state where the permanent magnet 12 is inserted into each magnet insertion hole 16.

(5) One set of magnets in which two or more permanent magnets 12 are combined may be respectively inserted into one magnet insertion hole 16. In this case, in one magnet insertion hole 16, the plurality of permanent magnets 12 may be arranged in the longitudinal direction of the magnet insertion hole 16. In one magnet insertion hole 16, the plurality of permanent magnets 12 may be arranged in an extending direction of the magnet insertion hole 16. In one magnet insertion hole 16, the plurality of permanent magnets 12 may be arranged in the extending direction while the plurality of permanent magnets 12 are arranged in the longitudinal direction.

(6) In the above-described embodiment, the laminated body 10 in which the plurality of punched members W are laminated functions as the iron core body to which the permanent magnet 12 is mounted, but the iron core body may be configured with a member other than the laminated body 10. Specifically, the iron core body may be obtained, for example, by compression molding of strong magnetic body powder, or by injection molding of a resin material containing strong magnetic body powder.

(7) The present technology may be applied to iron core products (for example, stator laminated core) other than the rotor laminated iron core 1. Specifically, the technology may be applied when providing a resin film for insulating between the stator laminated core and the winding on an inner circumferential surface of a slot of the stator laminated core. The stator laminated core may be a split type stator laminated core formed by combining a plurality of core pieces, or may be a non-split type stator laminated core.

(8) The technology may be applied to molded articles other than iron cores. For example, the technology may be applied when manufacturing a semiconductor package by resin-molding a semiconductor chip placed on a lead frame.

EXAMPLES

Example 1

The method for manufacturing an iron core product according to one example of the disclosure includes: providing an iron core body which includes a magnet insertion hole in which a permanent magnet is disposed; injecting a molten resin into the magnet insertion hole of the iron core body at a first pressure; and setting a pressure applied to the molten resin to a second pressure lower than the first pressure after the molten resin is injected into the magnet insertion hole and before the molten resin is cured. In this case, after the injection of the molten resin into the magnet insertion hole and before the curing of the molten resin, the pressure that acts on the molten resin changes from the pressure P1 to the pressure P2. In other words, the pressure that acts on the molten resin decreases in a state where the molten resin does not lose the fluidity before the solidification. Therefore, since a part of the molten resin flows to the outside of the magnet insertion hole according to the change in pressure, the pressure that acts on the magnet insertion hole from the molten resin also decreases. Therefore, the swelling of the iron core product caused by the injection of the molten resin can be suppressed. As a result, the iron core product having an outer shape according to the design dimensions can be obtained.

Example 2

In the method of Example 1, setting the pressure applied to the molten resin to the second pressure may be performed after the molten resin is injected into the magnet insertion hole and before a gel time of the molten resin elapses. In the specification, "gel time" refers to the time until the molten resin reaches gelation at a predetermined curing temperature according to JIS K 7071-1988 "Testing Method for Prepreg, Carbon Fiber and Epoxy Resins". "Gelation" refers to a case where the viscosity of the molten resin rapidly increases in a middle stage of curing by heating and becomes a gel state according to JIS K 7071-1988 "Testing Method for Prepreg, Carbon Fiber and Epoxy Resins". According to Example 2, before the viscosity of the molten resin drastically increases, the pressure acting on the molten resin changes from the first pressure to the second pressure. Therefore, since a part of the molten resin flows to the outside of the magnet insertion hole in a state where the fluidity is higher, the pressure acting on the magnet insertion hole from the molten resin also decreases. Therefore, the swelling of the iron core product caused by the injection of the molten resin can be further suppressed.

Example 3

In the method according to Example 1 or 2, injecting the molten resin at the first pressure may include extruding the molten resin into the magnet insertion hole by a plunger of which an injection pressure is set to the first pressure, and setting the pressure applied to the molten resin to the second pressure may include changing the injection pressure of the plunger to the second pressure. In this case, the magnitude of the pressure acting on the molten resin can be easily set via the plunger.

Example 4

The method according to Example 1 or 2 may further include providing the iron core body which includes another magnet insertion hole in which another permanent magnet is disposed; injecting the other molten resin into the other magnet insertion hole at a third pressure different from the first pressure; and setting a pressure applied to the other molten resin to a fourth pressure lower than the third pressure after the other molten resin is injected into the other magnet insertion hole and before the other molten resin is cured. In this case, the pressure at the time of the injection of the molten resin is set independently for each of the magnet insertion holes. Therefore, the molten resin can be injected into the magnet insertion hole at an appropriate pressure in accordance with the size, shape, position, and the like of the magnet insertion hole.

Example 5

In the method according to Example 4, the magnet insertion hole may extend along the circumferential direction of the iron core body, and the other magnet insertion hole may extend along a direction intersecting a longitudinal direction of the magnet insertion hole when viewed from a height direction of the iron core body.

Example 6

In the method of Example 5, the first pressure may be set to be lower than the third pressure. Incidentally, when the magnet insertion hole extends along the circumferential direction of the iron core body, the projected area of the magnet insertion hole with respect to the circumferential surface of the iron core body tends to increase. Therefore, when the molten resin is injected into the magnet insertion hole, the force of the molten resin acting toward the circumferential surface of the iron core body becomes larger, and the iron core product tends to easily swell. However, according to Example 6, the pressure of the molten resin injected into the magnet insertion hole that extends along the circumferential direction of the iron core body is set to be lower than the pressure of the molten resin injected into the other magnet insertion hole that extends along the radial direction of the iron core body. Therefore, the force acting from the magnet insertion hole toward the circumferential surface of the iron core body is reduced. Therefore, the swelling of the iron core product caused by the injection of the molten resin can be further suppressed.

Example 7

The apparatus for manufacturing an iron core product according to another aspect of the disclosure includes: a resin injection device configured to inject a molten resin into an iron core body; and a controller. The controller controls the resin injection device to inject the molten resin into a magnet insertion hole, in which a permanent magnet is disposed, of the iron core body at a first pressure, and controls the resin injection device to set a pressure applied to the molten resin to a second pressure lower than the first pressure after the molten resin is injected into the magnet insertion hole and before the molten resin is cured. In this case, the same effects as those of the method of Example 1 can be obtained.

The reference numerals and signs of the elements according to the embodiments of the present disclosure are listed below.
1: rotor laminated iron core
10: laminated body (iron core body)
12: permanent magnet
14: solidified resin
100: manufacturing apparatus
130: punching device
200: magnet mounting device (resin injection device)
230: plunger
Ctr: controller (control unit)

What is claimed is:

1. A method for manufacturing an iron core product, the method comprising:
   providing an iron core body which includes a magnet insertion hole in which a permanent magnet is disposed;
   injecting a molten resin into the magnet insertion hole of the iron core body at a first pressure;
   setting a pressure applied to the molten resin to a second pressure lower than the first pressure after the molten resin is injected into the magnet insertion hole and before the molten resin is cured;
   connecting an accommodation hole communicatively with the magnet insertion hole; and
   allowing a part of the molten resin to flow from the magnet insertion hole and back into an outside of the magnet insertion hole as a result of lowering the first pressure to the second pressure.

2. The method according to claim 1, wherein setting the pressure applied to the molten resin to the second pressure is performed after the molten resin is injected into the magnet insertion hole and before a gel time of the molten resin elapses.

3. The method according to claim 1, wherein injecting the molten resin at the first pressure includes extruding the molten resin into the magnet insertion hole by a plunger of which an injection pressure is set to the first pressure, and
   setting the pressure applied to the molten resin to the second pressure includes changing the injection pressure of the plunger to the second pressure.

4. The method according to claim 1, further comprising:
   providing the iron core body which includes another magnet insertion hole in which another permanent magnet is disposed;
   injecting another molten resin into the other magnet insertion hole at a third pressure different from the first pressure; and
   setting a pressure applied to the other molten resin to a fourth pressure lower than the third pressure after the other molten resin is injected into the other magnet insertion hole and before the other molten resin is cured.

5. The method according to claim 4, wherein the magnet insertion hole extends along a circumferential direction of the iron core body, and
   the other magnet insertion hole extends along a direction intersecting a longitudinal direction of the magnet insertion hole when viewed from a height direction of the iron core body.

6. The method according to claim 5, wherein the first pressure is set to be lower than the third pressure.

* * * * *